UNITED STATES PATENT OFFICE.

HENRY M. JOHNSTON, OF NEW YORK, N. Y.

IMPROVEMENT IN PIGMENTS FOR DISTEMPER PAINTING.

Specification forming part of Letters Patent No. 99,907, dated February 15, 1870.

*To all whom it may concern:*

Be it known that I, HENRY M. JOHNSTON, of the city, county, and State of New York, have invented a new and useful Improvement in Pigments; and I do hereby declare that the following is a full, clear, and exact description thereof.

In mixing distemper colors glue is most invariably used for the purpose of binding the pigments, in which case the glue requires long soaking, so as to cause it to dissolve easily, and it should be well boiled, to impart to it the quality of flowing freely when it is used with the colors, and when gum or paste is used as the binding material; then, as in the use of the glue, considerable time is consumed in preparing them. The pigments required to produce the color desired are then thoroughly mixed with water, after which the binding substance is then mixed in, and the color is then well strained, to remove any particles of grit.

The mixing of such colors requires long experience, and the time consumed in their preparation is often greater than that required in their use, and it is very difficult to determine the requisite quantity of the various pigments required to produce the desired colors or tints, and the most experienced artists cannot always determine what color such mixed pigments will dry, as they always appear much darker when they are wet. The usual method of testing them is to apply some to the surface that they are intended to cover and then allow them to dry. In most cases alterations have to be made to obtain the desired result.

Now it is the object of my invention to supply dry pulverized pigments of all desired colors, having the binding or adhesive materials intimately incorporated with the pigments, so that it will only be required to mix them with a stated quantity of water to render them fit for use.

I will now proceed to describe the methods I prefer for producing dry, pulverized, sized, or adhesive pigments, which will enable others skilled in the art to fully understand and make use of the same.

I use any of the white pigments, dry or in pulp, and I mix them in water, either alone or with any suitable colored pigments, so as to impart various desired colors to the white body; or, when strong, pure colors are required, I then use any of the colored pigments, or a mixture of them, without the whites, and if they are in a dry condition I then prefer to grind them in water until they are smooth and as free from grit as their nature will admit of. I then add a solution of glue, gum, or paste, and thoroughly incorporate it with the mixed pigments.

Any other suitable adhesive substance or substances that will impart the requisite adhesive quality to the pigments may be used in lieu of the solutions of glue, gum, or paste.

The mixture is then placed in shallow troughs to dry, or can be dried in any other suitable manner.

It is desirable not to use any more water in mixing the pigments or in preparing the adhesive solutions than is necessary for the purpose, as the mixture should be as dense as possible, so as to prevent any settling or separation of the pigments while the mixture is drying.

When glue is used as the binding material, and when the temperature will admit, I then chill the mixture and cut it into sheets, and dry them on nets, in the same manner as in the drying of glue, or after the drying is nearly completed the drying may be finished by artificial heat. The sheets of sized or adhesive pigments are then broken into small fragments in any convenient manner, and reduced to a fine powder by grinding in a mill or by the use of any other suitable device.

The pigments and adhesive substances may be mixed together in a dry condition in the following manner:

I take a given quantity of any of the pigments that may be required to produce the color desired and grind them to a fine powder, after which I make use of any suitable adhesive substance that is soluble in water and that is fitted to bind the pigments used, and I reduce it to a fine pulverized condition by grinding in a mill or in any other suitable manner. I then add the requisite quantity of pulverized adhesive substance to the powdered pigments and thoroughly incorporate them, or the dry adhesive substance and pigments may be ground together until reduced to a fine powder; but above all I give preference to the method described for mixing the adhesive substance and pigments together wet and then drying and pulverizing them.

When I mix the pigments and adhesive substance together by the wet process I sometimes use carbolic acid and camphor with the adhesive solution, so as to prevent decomposition and molding of the adhesive substance while the mixture is drying.

By the use of my invention I am enabled to supply a want long felt, by manufacturing dry, sized, or adhesive pigments of any desired colors, and in a finely-pulverized condition and commercial form, which pigments only require to be mixed with a stated quantity of water, and will then be ready for use in fresco or distemper painting, or in the manufacture of paper-hangings, enameled paper, and card-board, and for a great variety of uses where such colors are required.

Having thus described my invention, what I claim as new, and desire to secure by Letters Patent, is—

As a new article of manufacture, pulverized, sized, or adhesive pigments, substantially as described.

HENRY M. JOHNSTON.

Witnesses:
  DAVID EARLE,
  OSCAR S. FOLLETT.